June 5, 1956 M. E. MITCHELL 2,749,188
UTILITY POLE SERVICE EQUIPMENT
Filed June 23, 1952
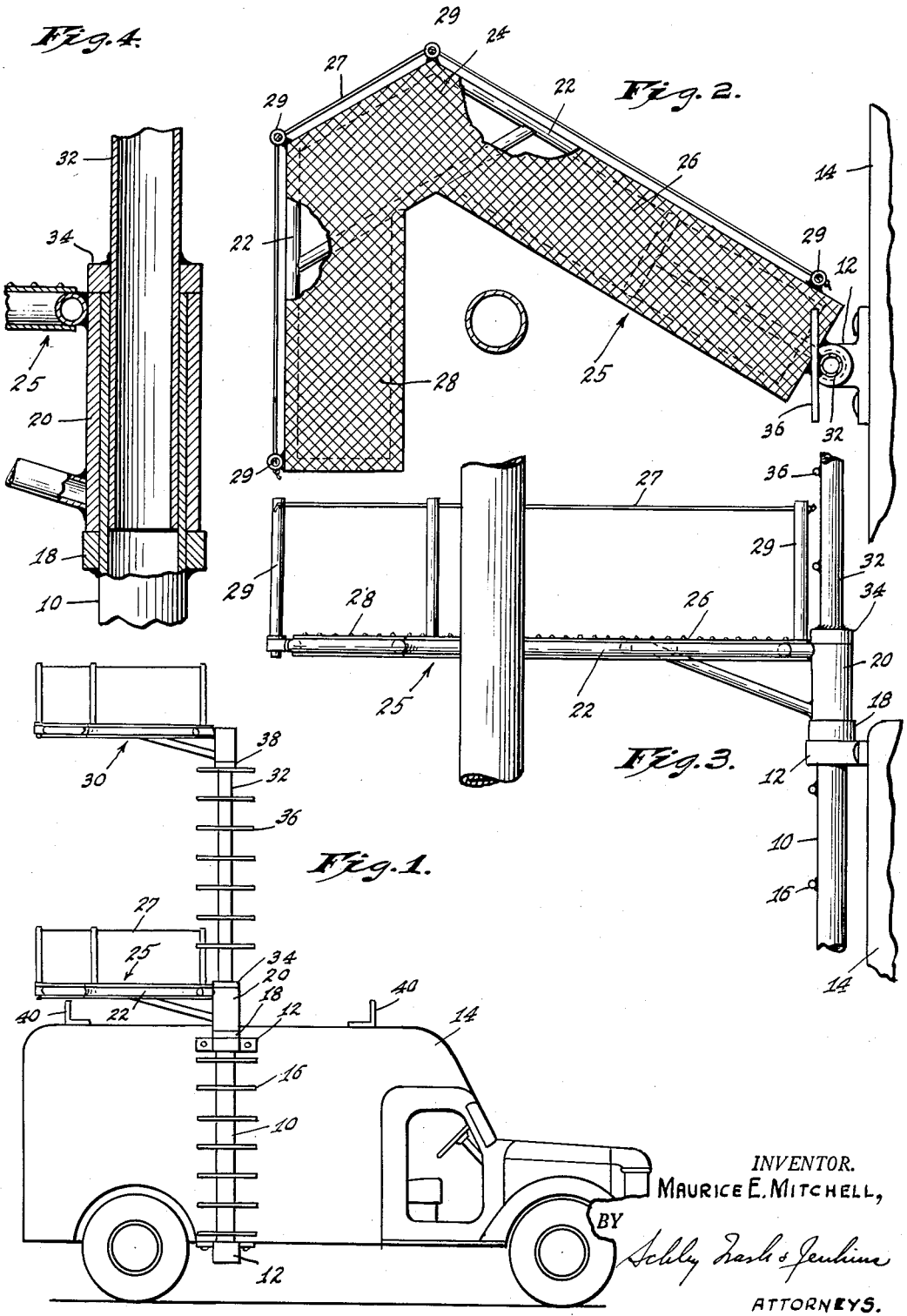
INVENTOR.
MAURICE E. MITCHELL,
BY
ATTORNEYS.

United States Patent Office 2,749,188
Patented June 5, 1956

2,749,188

UTILITY POLE SERVICE EQUIPMENT

Maurice Eugene Mitchell, Muncie, Ind., assignor to Mitchell Maintenance Company, Inc., Muncie, Ind., a corporation of Indiana Application June 23, 1952, Serial No. 295,099

2 Claims. (Cl. 304—9)

This invention relates to equipment for servicing utility poles or like objects, for example for painting tall street-light standards, and to a combination of such equipment with a vehicle such as a truck.

The painting of tall utility poles is tedious and time consuming, and involves a high labor cost. Only the lower portions of a pole can be painted from the ground. The upper parts are usually painted from a ladder which the painter must transport from pole to pole and which he must move and adjust, usually several times, during the painting of each tall pole. Much of the painter's time and effort is wasted in carrying the ladder and moving it around the pole.

In accordance with my invention, a platform is mounted for swiveling movement in a plane about a vertical support and comprises two or more walkways arranged to define a space between them which opens circumferentially with respect to the swivel axis. When the support is positioned adjacent a pole or like object, the platform can be swiveled to a position in which the pole lies in the space between the walkways and in which the walkways lie opposite two or more sides of the pole. The platform then provides a support from which a painter can reach all sides of the pole at one setting. Preferably, I make the platform substantially 7-shaped in plan and swivel it on an axis adjacent the base of the 7.

The equipment is preferably mounted on a truck or similar vehicle, and for such mounting I desirably provide a swivel support at the top of a post secured against the side of the truck, and mount the platform on that post at a level which permits it to be swiveled over the top of the truck when the truck is moved from one position to another. The post may be provided with ladder rungs to provide convenient access to the elevated platform.

The equipment may include more than a single platform. An extension post may be removably supported from the main post and a second platform mounted on top of the extension post. The second platform and the extension post are desirably of relatively light weight so that they can be taken down by one man and stored on top of the truck when the truck is moved from one job to another.

The accompanying drawing illustrates my invention. In such drawing:

Fig. 1 is a side elevation of a truck equipped with service equipment embodying my invention;

Fig. 2 is a plan view of the platform shown in Fig. 1, disposed in its work position adjacent a pole;

Fig. 3 is a front elevation of the platform shown in Fig. 2; and

Fig. 4 is a vertical section of the upper end of the main supporting post.

In the equipment shown in the drawing, a main supporting post 10 is secured by brackets 12 against the side of a truck 14, with its upper end extending somewhat above the roof of the truck. The main post is conveniently a section of pipe, say of three inches diameter, and ladder rungs 16 are welded at spaced points to it. Near its upper end, the post 10 carries a collar 18 to form a swivel support for a mounting sleeve 20 for a platform 25.

As shown, the platform 25 comprises a frame 22 of tubular stock covered with a mesh flooring 24. It includes a walkway 26 which extends generally radially from the swivel support 18, and a lateral walkway 28 which extends generally circumferentially with respect to the swivel support 18. The platform is substantially of figure 7 shape in plan and the two walkways 26 and 28 lie at an acute angle to each other and form a V-shaped space between them which is open in a direction circumferentially of the swivel axis.

Desirably, the platform carries a suitable guide rail around its outer edge. This may consist of a rope 27 strung between posts 29 removably carried by brackets welded to the frame 22 of the platform.

To support a second platform 30 at a higher elevation, say about six and one-half feet above the lower platform 25, an extension post 32 is removably mounted on the main post 10. Conveniently, the extension post may be a piece of pipe of smaller diameter than the main post 10, and mounted thereon by slipping its lower end into the open upper end of the main post 10. A collar 34 welded to the extension post 32 supports that post against the upper end of the main post 10. The extension post may be provided with ladder rungs 36 similar to those of the main post. The platform 30 is similar to the platform 25, and is similarly swiveled on a swivel support 38 at the upper end of the extension post.

For transporting the equipment from job to job, the extension post and upper platform 30 are desirably removed and stored on or between suitable brackets 40 on the roof of the truck 14, although in moving from one to another of a series of poles, the upper platform can usually be left in place.

During movement of the truck, each platform is swiveled to a storage position in which it overlies the roof of the truck, as shown in Fig. 1. To put the equipment to use, the truck is driven to a point alongside the pole to be serviced, with the post 10 generally opposite that pole. The platform to be used is then swiveled outward from the truck to carry its outer walkway to a position on the opposite side of the pole from the truck, with the pole positioned in the space defined by the two walkways. The walkways then provide a platform from which the painter can reach all sides of the pole.

The lower portions of a pole can be painted from the ground, the intermediate section of the pole can be painted from the lower platform 25, and the upper section of a tall pole can be painted from the platform 30. With many streetlight poles on which the light is supported by an arm extending from the pole, the arm can also be painted from the upper platform 30 by swiveling it about its support to a suitable position.

I claim as my invention:

1. Apparatus for expediting the painting of poles such as utility poles, comprising a vehicle movable from pole to pole, a vertical platform support carried at the side of the vehicle, a platform swiveled adjacent its end on said support and having a first walkway extending generally radially of the swivel axis and a second walkway extending generally tangentially with respect to said axis and at an acute angle to the first walkway, said platform being movable about the swivel axis between a position overlying the vehicle and a position which disposes said second walkway parallel with the vehicle and spaced from the side thereof, whereby the vehicle can be moved to a position alongside a pole and the platform swung about its swivel axis to position the said second walkway on the opposite side of a pole from the vehicle.

2. A work-platform adapted to be mounted on a truck to expedite the painting of poles such as utility poles, comprising a support adapted to be mounted adjacent the side of a truck, a platform, means to mount the platform for swivel movement on said support in a position to lie above the structure of the truck, said platform having a first walkway extending generally radially of said swivel mounting and a second walkway carried at the free end of the first and extending generally tangentially with respect to the swivel axis and at an acute angle to said first walkway, said platform being adapted to swivel on its mounting between a transport position overlying the structure of a truck on which the mounting is carried and a use position projecting from the side of such truck and in which use position the second walkway lies in spaced parallel relation to the truck on the opposite side therefrom of a pole standing beside the truck, with the first walkway extending diagonally from the truck, whereby the two walkways lie opposite pole surface areas spaced substantially more than 90 degrees from each other to give ready access to the entire circumferential surface of the pole.

References Cited in the file of this patent

UNITED STATES PATENTS

| | | |
|---|---|---|
| 377,953 | Mills | Feb. 14, 1888 |
| 789,650 | Berg et al. | May 9, 1905 |
| 1,331,121 | Nelson | Feb. 17, 1920 |
| 1,470,296 | Stedman | Oct. 9, 1923 |
| 1,921,631 | Miller | Aug. 8, 1933 |
| 2,164,327 | Hawkins | July 4, 1939 |
| 2,450,812 | Ray | Oct. 25, 1948 |
| 2,522,036 | Haake | Sept. 12, 1950 |
| 2,601,092 | Cardiff | June 17, 1952 |
| 2,614,893 | Merril et al. | Oct. 21, 1952 |